(12) United States Patent
Lancioni et al.

(10) Patent No.: US 10,728,218 B2
(45) Date of Patent: Jul. 28, 2020

(54) GATEWAY WITH ACCESS CHECKPOINT

(71) Applicant: McAfee, LLC, Santa Clara, CA (US)

(72) Inventors: German Lancioni, San Jose, CA (US); Eric Donald Wuehler, Beaverton, OR (US)

(73) Assignee: McAfee, LLC, Santa Clara, CA (US)

( * ) Notice: Subject to any disclaimer, the term of this patent is extended or adjusted under 35 U.S.C. 154(b) by 116 days.

(21) Appl. No.: 15/905,606

(22) Filed: Feb. 26, 2018

(65) Prior Publication Data
US 2019/0268307 A1 Aug. 29, 2019

(51) Int. Cl.
*H04L 29/00* (2006.01)
*H04L 29/06* (2006.01)

(52) U.S. Cl.
CPC ...... *H04L 63/0281* (2013.01); *H04L 63/0263* (2013.01); *H04L 63/08* (2013.01); *H04L 63/20* (2013.01)

(58) Field of Classification Search
CPC . H04L 63/0281; H04L 63/0263; H04L 63/20; H04L 63/08
See application file for complete search history.

(56) References Cited

U.S. PATENT DOCUMENTS

| | | | |
|---|---|---|---|
| 6,185,567 B1 | 2/2001 | Ratnaraj et al. | |
| 6,463,474 B1 * | 10/2002 | Fuh | H04L 63/0227 709/225 |
| 6,609,154 B1 * | 8/2003 | Fuh | H04L 63/0227 709/225 |
| 6,799,177 B1 | 9/2004 | Fai et al. | |
| 6,842,460 B1 * | 1/2005 | Olkkonen | H04W 48/16 370/328 |
| 7,506,054 B1 * | 3/2009 | Fuh | H04L 63/0227 709/225 |
| 7,624,422 B2 * | 11/2009 | Williams | H04L 41/0853 726/1 |
| 8,074,259 B1 * | 12/2011 | Levy | H04L 63/08 726/2 |
| 8,397,988 B1 | 3/2013 | Zuili | |
| 9,465,942 B1 * | 10/2016 | Kane-Parry | G06F 21/57 |
| 2005/0021980 A1 * | 1/2005 | Kanai | G06F 21/608 713/182 |
| 2006/0015937 A1 * | 1/2006 | Illowsky | G06F 1/3203 726/18 |

(Continued)

FOREIGN PATENT DOCUMENTS

WO 2019165336 A1 8/2019

OTHER PUBLICATIONS

PCT International Search Report and Written Opinion issued in PCT/US2019/019335 dated Jun. 26, 2019; 9 pages.

*Primary Examiner* — Don G Zhao
(74) *Attorney, Agent, or Firm* — Patent Capital Group

(57) ABSTRACT

There is disclosed in one example a gateway apparatus to operate on an intranet, including: a hardware platform; and an access proxy engine to operate on the hardware platform and configured to: intercept an incoming packet; determine that the incoming packet is an access request directed to an access interface of a resource of the intranet; present an access checkpoint interface; receive an authentication input response; validate the authentication input response; and provide a redirection to the access interface of the device.

25 Claims, 6 Drawing Sheets

(56) References Cited

U.S. PATENT DOCUMENTS

| | | | |
|---|---|---|---|
| 2006/0143699 A1* | 6/2006 | Nagata | H04L 63/0227 726/11 |
| 2007/0211738 A1* | 9/2007 | Guo | H04L 29/06027 370/401 |
| 2007/0288247 A1* | 12/2007 | Mackay | G06Q 10/00 705/1.1 |
| 2008/0028436 A1* | 1/2008 | Hannel | H04L 63/0218 726/1 |
| 2009/0013401 A1* | 1/2009 | Subramanian | G06F 21/6218 726/17 |
| 2009/0037224 A1* | 2/2009 | Raduchel | G06Q 50/24 705/3 |
| 2010/0223164 A1* | 9/2010 | Fortier | G06Q 20/02 705/30 |
| 2011/0087888 A1* | 4/2011 | Rennie | G06F 21/41 713/182 |
| 2011/0301982 A1* | 12/2011 | Green, Jr. | G06Q 10/06 705/3 |
| 2012/0078727 A1* | 3/2012 | Lee | G06Q 30/02 705/14.66 |
| 2012/0084151 A1* | 4/2012 | Kozak | G06Q 30/02 705/14.58 |
| 2012/0084348 A1* | 4/2012 | Lee | G06Q 30/02 709/203 |
| 2012/0084349 A1* | 4/2012 | Lee | G06Q 30/02 709/203 |
| 2012/0331528 A1* | 12/2012 | Fu | H04L 67/10 726/4 |
| 2015/0046192 A1* | 2/2015 | Raduchel | H04W 8/18 705/3 |
| 2015/0046971 A1* | 2/2015 | Huh | H04L 9/3213 726/1 |
| 2015/0096002 A1 | 4/2015 | Shuart et al. | |
| 2017/0019487 A1* | 1/2017 | Maheshwari | H04L 67/16 |
| 2017/0279767 A1 | 9/2017 | Fork et al. | |
| 2018/0041934 A1* | 2/2018 | Agarwal | H04W 36/0066 |
| 2018/0095439 A1* | 4/2018 | Karbasian | G05B 19/0426 |
| 2018/0115554 A1* | 4/2018 | Dyon | H04L 63/102 |
| 2018/0124092 A1* | 5/2018 | Pope | G06F 21/577 |
| 2018/0375736 A1* | 12/2018 | Khanna | H04L 41/12 |
| 2018/0376416 A1* | 12/2018 | Khanna | H04W 52/0212 |
| 2019/0102556 A1* | 4/2019 | Case | G06F 21/575 |
| 2019/0132738 A1* | 5/2019 | Zhang | H04L 63/0869 |
| 2019/0296967 A1* | 9/2019 | Yang | H04L 41/0893 |
| 2019/0349426 A1* | 11/2019 | Smith | H04W 4/08 |

\* cited by examiner

GATEWAY WITH ACCESS CHECKPOINT

FIELD OF THE SPECIFICATION

This disclosure relates in general to the field of home network security, and more particularly, though not exclusively, to a system and method for providing a gateway with access checkpoint.

BACKGROUND

The "Internet of things" (IoT) is a term that refers loosely to the many "smart" devices that are starting to become ubiquitous in society. These devices can appear, for example, in a home or office automation scheme. The IoT includes physical devices and other items embedded with electronics, software, sensors, and actuators. Because these devices and items also include network connectivity, they can collect and exchange data with other devices, items, and computers.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
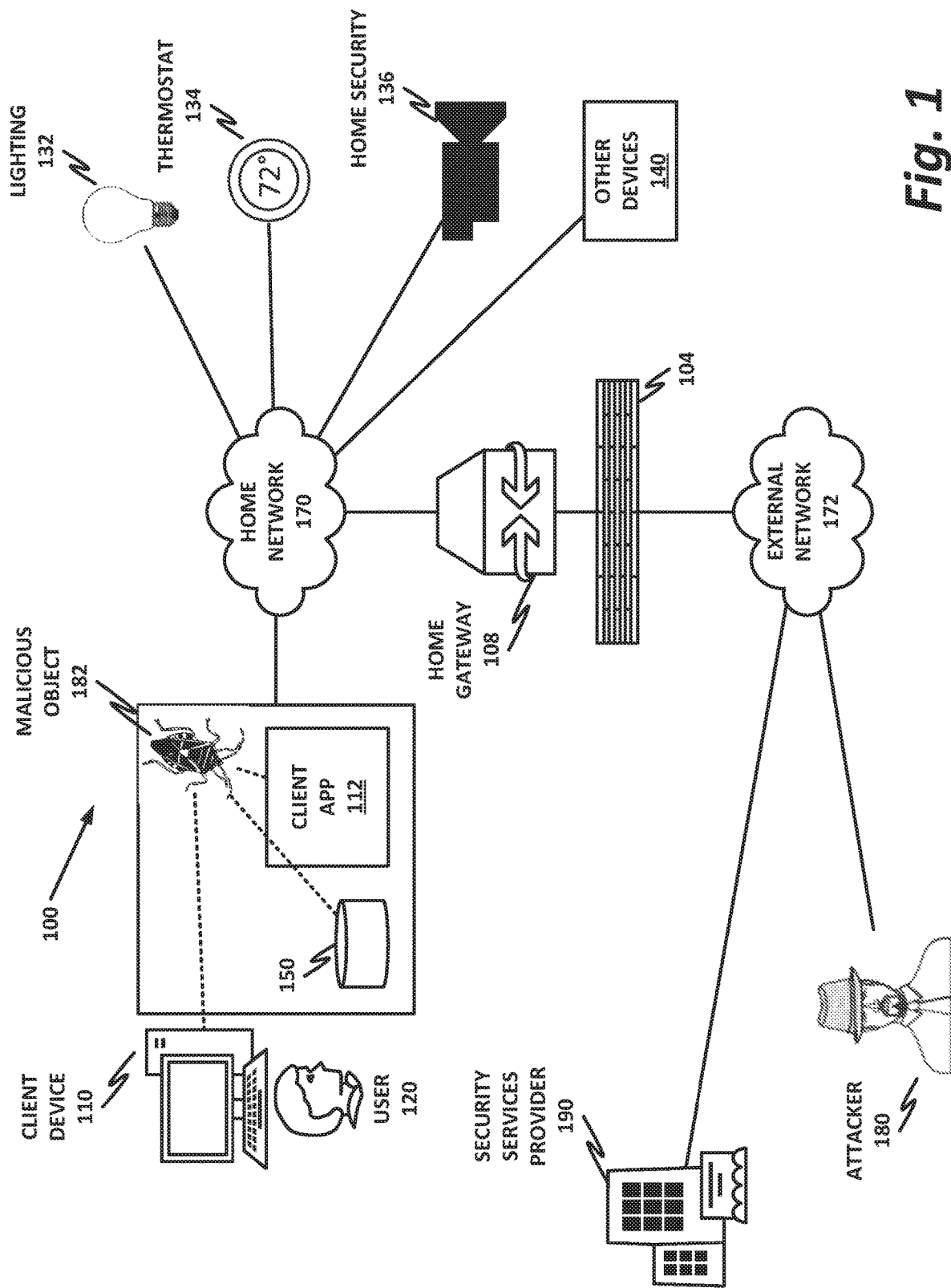
FIG. 1 is a block diagram of a home network, according to one or more examples of the present specification.

In an example, there is disclosed a gateway apparatus to operate on an intranet, including: a hardware platform; and an access proxy engine to operate on the hardware platform and configured to: intercept an incoming packet; determine that the incoming packet is an access request directed to an access interface of a resource of the intranet; present an access checkpoint interface; receive an authentication input response; validate the authentication input response; and provide a redirection to the access interface of the device.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

With the increasing amount of connected IoT devices at home, security is becoming a challenge for users without technical expertise. At the same time, the home gateway or router is becoming a common point that centralizes the local network operation and security. But the risk of IoT devices being compromised (e.g., by botnets or data exfiltration) is still high, as IoT devices may not be regularly patched, and home users are often not security experts. Those users may be unaware of default or weak login credentials for network-enabled devices, and may lack the technical expertise to mitigate these security holes.

A user can secure home devices by manually configuring each device by changing default or weak access credentials. For example, "out of the box," the device may connect to a wired or wireless home network and receive an Internet protocol (IP) address via dynamic hostname configuration protocol (DHCP), such as "192.168.1.27." The user may then open a web browser and enter "https://192.168.1.27/login.html" into the address bar, and be presented with a login page. This login page may have weak default login credentials, such as "username:admin" and "password:admin." After the user enters these default credentials, he may enter an administration portal, where he can perform a number of administrative tasks, including changing the default weak login credentials to more secure credentials.

This configuration may require technical knowledge of things such as Internet protocol (IP) addresses, administration interfaces, pairing procedures, and network configuration. If the user lacks this knowledge, he may not be able to successfully configure and secure his IoT device.

Many existing access control solutions are based on isolated credential challenges for each device in a network. In other words, the manufacturer of a particular device provides a login interface for that device if a login interface is required. If a user wishes to login to the device, such as an IP camera, the user accesses a network address (such as a uniform resource locator (URL)) that points to the device and logs into the device via the manufacturer-provided login interface.

Some manufacturers use default, standardized, blank, or other insecure login credentials by default. This can reduce the cost of manufacturing these devices, as each manufactured device has identical login credentials. It is anticipated by these manufacturers that the end user will change the default login credentials to something more secure upon setting up the device. But if the user fails to do so, the device may be exposed to potential attacks. This problem may be exacerbated by the fact that many manufacturers use the same or similar default login credentials, along with similar access interfaces.

Alternatively, a device may be configured via a router with access point (AP) isolation, which allows devices to connect to the Internet but without the capability of connecting to other local devices. This configuration mitigates some of the risk, but does not eliminate the problem of the device being compromised from outside the local network.

Furthermore, AP isolation is not something that a common end user will perform, as it requires technical knowledge. AP isolation may also not be appropriate for devices that require both Internet and local network access.

Embodiments of the home gateway of the present specification lower the risk of an IoT device being compromised by attackers, while at the same time maintaining an acceptable level of convenience and transparency for the end user. In particular, embodiments provide an access security checkpoint enforced by a home gateway router before the user interacts with a potentially weak IoT device, including a device that may still have the default login credentials or that may otherwise be flagged as sensitive.

In one embodiment, a home gateway router detects and secures potentially weak devices in the network. This may include detecting a newly added device and setting up appropriate access rules for that device. This may also include intercepting incoming access requests to resources in these devices, and adding an access checkpoint rule that may be configured according to three primary analysis vectors: session, context, and severity.

Embodiments reduce the probability of home devices being compromised by attacks that are aimed at weak login interfaces. The home gateway may analyze an incoming resource access request and provide a tiered authentication checkpoint before granting access to the device's resource. Furthermore, the home gateway may have the ability to enforce access policies through the access checkpoint, regardless of the capabilities of the target device. This can be especially beneficial for legacy devices, which may lack any security mechanism, or which may have had security tacked on as an afterthought.

When any user attempts to access a resource of an IoT device (for example, the login interface of an IP camera), the router intercepts the call (e.g., via hypertext transfer protocol (HTTP) or HTTP secure (HTTPS)) and determines if the request requires intervention based on the current access context. If intervention is required, the router returns an access checkpoint resource that requires the user to authenticate with the router, itself. For example, the user may be required to enter the router username and password. Note that the router username and password is a nonlimiting example, and in other cases, the router could be configured to require per-device username and password combinations to avoid a single point of failure. Furthermore, if additional security is desired, further authentication could include two-factor authentication, biometric authentication, or any other security mechanism consistent with the desired security of the device.

After the user has successfully authenticated and passed the access checkpoint, the router redirects to the original IoT device resource, for example, by directing the user to the device login page. In some cases, the user may then be required to enter the default or weak login credentials for the device. In other embodiments, the home gateway could enter those credentials once the user is successfully authenticated to the home gateway, and thus send the user directly to the administration interface for the device. This tiered access may be ruled by a session attached to a particular access context, which balances convenience of the user with the concern of maintaining a reasonable level of security for the device.

Embodiments of the home gateway described herein add "lifeguard access control" to potentially weak IoT device resources such as HTTP login interfaces. Thus, even if the user does not change the default credentials, an attack is much less likely. At the same time, because the access checkpoint takes into consideration the current network context (e.g., the session, request, origin, and severity of the resource, by way of nonlimiting example), the solution adapts to the convenience of the user while maintaining additional security. For example, if the user accesses the same resource three times within an hour, the access checkpoint may be activated only the first time. This reduces the friction introduced by the router in the interaction process between the user and the IoT device.

Because the access checkpoint is managed by the home gateway, it is possible to set and enforce different policies that may not even be available on the target devices. For example, basic or legacy devices may lack a login interface and have no security at all, or may have only a simple login interface without controls, such as a number of unsuccessful login attempts that can be performed. By acting as an intermediary between these devices and access requests, the home gateway can provide this additional security when intercepting access requests, thus adding a consistent security protocol across all home devices.

When the home gateway receives an incoming request, the router analyzes the request to determine if the request is an access request (for example, the request is directed to a known login resource). The home gateway determines if the request is an access interface by, for example, examining the request and the resource content, which may include the resource path (e.g., 192.168.1.27/main/login.HTML), hypertext markup language (HTML) tags (for example, user login, and/or password fields), resource type and parameters, and HTTP headers and ports, by way of nonlimiting example. When the incoming request is classified as an access interface request, the resource may be added to an access proxy rules table (APRT). Thus, further access requests may not necessarily require a repeat of the analysis.

Other embodiments of access and configuration interfaces include, by way of nonlimiting example, secure shell (SSH), telnet, and shared desktops such as X11 or remote desktop protocol (RDP).

Furthermore, embodiments of the present specification may include a discovery function, wherein newly added IoT resources are automatically discovered and checked for weak or default login credentials. This can be accomplished, for example, by determining that a device has been newly attached to the network, and scanning the device for common or known login interfaces. For example, the device may be scanned for common interfaces such as login.html, login.aspx, login.php, main.html, main.aspx, main.php, default.html, default.aspx, default.php, or other commonly used names. If such an access interface is available, the page may be scanned for login fields, and the home gateway may attempt to log in via common or standardized credentials, such as blank login credentials, login credentials with "admin" as both the username and password, credentials with username "admin" and password "password," or credentials wherein the username is the device name and the password is "admin," "password," or blank. These are provided as nonlimiting examples only, and other default or common credentials could be used. Once these are discovered, an entry may be added to the APRT so that the interface is ready to use the first time the user logs in. In some embodiments, the user may specify as a configuration option whether to automatically scan for new devices, or whether to configure a new device only upon the first access request.

TABLE 1 is an example of an APRT that may be used in an embodiment of a home gateway. Fields in Table 1 include resource, device, session, severity, and policy.

TABLE 1

Example APRT Entries

| Resource | Device | Session | Severity | Policy |
|---|---|---|---|---|
| /login.htm | DVR 112B (192.168.1.15) | N/A | 3 | Default |
| /admin/index.php | Camera DLink-101A (192.168.1.7) | eyJhbGciOiJIUzI | 5 | (3) Login attempts maximum (30') Maximum session time |
| :9191 | Printer HP1102 (192.168.1.5) | N/A | 4 | Default |
| :5001 | NAS DS213 (192.168.1.3) | yRQYnWzskCZU | 5 | Local access only |

The resource field may identify resources that are available on a particular device for the login interface. For example, these can specify a path, interface, or port number that identifies a particular access request as a login request.

The device field identifies the device, for example, in terms of both a name and an IP address. The device field could also include a media access control (MAC) address, which may be useful if it is desirable to maintain consistency across changes in IP address.

The session field may be a field in which a session identifier for an existing session is stored. As discussed above, a session may include a timeout which may have a default value, and/or which may be user-configurable. For example, a session may be maintained for one hour, during which time the user accessing the resource does not need to continue to authenticate to the home gateway to continue accessing the resource.

The severity field may be a scaler that indicates the potential harm or severity of an unauthorized access to the device. The severity field may be useful in crafting a policy, such as the strength of authentication required, the availability and/or length of a session, and other factors that may affect security. This can include the policy field. In one example, a higher severity number indicates a higher risk, and thus may correspond to a higher security requirement. A lower severity indicates a lower risk and may thus correspond to a lower security requirement.

The policy field may indicate a policy for the resource. For example, a default policy may be defined, with a default security requirement and a default session length. For higher severity devices, greater security requirements may be specified, such as a maximum number of unsuccessful login attempts before access to the device is locked out for a particular time, and a maximum session time. The policy could also include locality policies, for example, whether the device can be accessed only via the local network, only via an extranet, or via both.

After a request has been positively classified as an access request, the home gateway intercepts the request to the resource and stores its information to redirect to the resource later. The home gateway then returns an access checkpoint interface. The access checkpoint may be, for example, the same interface used by the router to log into the network administration panel. However, this is a nonlimiting example, and a per-device access checkpoint could also be used. The access checkpoint may require the user to authenticate before proceeding to the target resource.

Once the user successfully authenticates at the access checkpoint, the router may redirect to the original resource the user attempted to reach. In some embodiments, the APRT may have stored therein the known login credentials for the resource, in which case the home gateway may perform authentication to the device. This may remove an extra step for the user, though this is optional, as in some cases, it is desirable to provide a multi-tiered access, wherein the user must authenticate both to the home gateway and to the device itself.

After redirecting the user, the home gateway creates a session token for the resource and stores the session token, for example, in the APRT. The session token may include a particular access scope (for example, local access only) and an expiration policy (for example, one hour). While the scope remains the same, the session token may be used by the home gateway to validate further interactions between the user and the resource, so that the access checkpoint is not repeatedly presented to the user. For example, if the user needs to access the IP camera three times within one hour, the access checkpoint is presented only the first time. If the access scope changes (for example, an access attempt comes in from an extranet), the router may invalidate the session token and the process may reset to intercept the request and redirect the user to the access checkpoint.

Because the access checkpoint is managed by the home gateway, the home gateway may implement and enforce different policies. These policies can indicate the number of unsuccessful login attempts, a maximum session time, a local intranet versus extranet access policy, or similar. Thus, even if the device being accessed does not support the security policies, the access checkpoint may supply the policies transparently to the user. Note than an "intranet" as used here, and throughout this specification and the appended claims, should be understood broadly to encompass any network or combination of networks that are or can be managed by a particular entity or enterprise. One attribute of an intranet is its division from an external "extranet" (e.g., the Internet). In common practice, the intranet is controlled by one or more gateways that divide the intranet from the extranet. Devices within the intranet may have relatively more privileged access to the intranet than devices that reside solely on the extranet. Note, however, that the division need not be absolute. For example, a user operating on the extranet may use a virtual private network (VPN) client to proxy into the network, and thus may gain full or partial intranet privileges despite operating initially from the extranet.

Optionally, the home gateway may also attempt to prepopulate the table instead of waiting for each incoming request to be analyzed. In this approach, the system attempts to discover all devices and associated resources on the network. For each resource, the system may simulate several logins using a dictionary of common default or weak credentials. This process may be executed periodically, but with low frequency, so that login policies are not disrupted. As another option, the process may be performed when the home gateway is first connected to the home network, and then may be repeated only when a new device is discovered on the network. If login policies are disrupted, disrupted device resources may be flagged with high severity and added to the APRT. This process of simulating login attempts may be performed similar to how automation tools work.

It should be noted that throughout this specification, a home network and home automation are provided as non-limiting and illustrative examples only. The IoT devices described herein are provided by way of example, and other IoT devices may be used. Furthermore, a home gateway is provided as an illustrative example of an embodiment of the teachings of the present specification. However, this example is intended to be nonlimiting. The teachings of this specification could also be applied to enterprises or other networks, and the examples discussed herein should be understood to encompass such alternative embodiments.

A system and method for providing a gateway with access checkpoint will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a home network 100, according to one or more examples of the present specification. In the example of FIG. 1, home network 100 may be a "smart home" with various Internet of things (IoT) devices that provide home automation or other services. Home network 100 is provided herein as an illustrative and nonlimiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 100, one or more users 120 operate one or more client devices 110. A single user 120 and single client device 110 are illustrated here for simplicity, but a home or enterprise may have multiple users, each of which may have multiple devices.

Client devices 110 may be communicatively coupled to one another and to other network resources via home network 170. Home network 170 may be any suitable network or combination of one or more networks operating on one or more suitable networking protocols, including a local area network, an intranet, a virtual network, a wide area network, a wireless network, a cellular network, or the Internet (optionally accessed via a proxy, virtual machine, or other similar security mechanism) by way of nonlimiting example. Home network 170 may also include one or more servers, firewalls, routers, switches, security appliances, antivirus servers, or other network devices, which may be single-purpose appliances, virtual machines, containers, or functions running on client devices 110.

In this illustration, home network 170 is shown as a single network for simplicity, but in some embodiments, home network 170 may include any number of networks, such as one or more intranets connected to the Internet. Home network 170 may also provide access to an external network, such as the Internet, via external network 172. External network 172 may similarly be any suitable type of network.

Home network 170 may connect to the Internet via a home gateway 108, which may be responsible, among other things, for providing a logical boundary between home network 172 and external network 170. Home network 170 may also provide services such as dynamic host configuration protocol (DHCP), gateway services, router services, and switching services, and may act as a security portal across home boundary 104.

Home network 100 may also include a number of discrete IoT devices, which in contemporary practice are increasing regularly. For example, home network 100 may include IoT functionality to control lighting 132, thermostats or other environmental controls 134, a home security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Home network 100 may communicate across home boundary 104 with external network 172. Home boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to home network 100, such as security software, security updates, network appliances, or similar. For example, McAfee, Inc. provides a comprehensive suite of security services that may be used to protect home network 100.

It may be a goal of users 120 and home network 100 to successfully operate client devices 110 and IoT devices without interference from attacker 180 or from unwanted security objects. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to home resources. Furthermore, attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against home network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any security object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 100 may contract with or subscribe to a security services provider 190, which may provide security services, updates, antivirus definitions, patches, products, and services. McAfee®, Inc. is a nonlimiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

Figure 2:
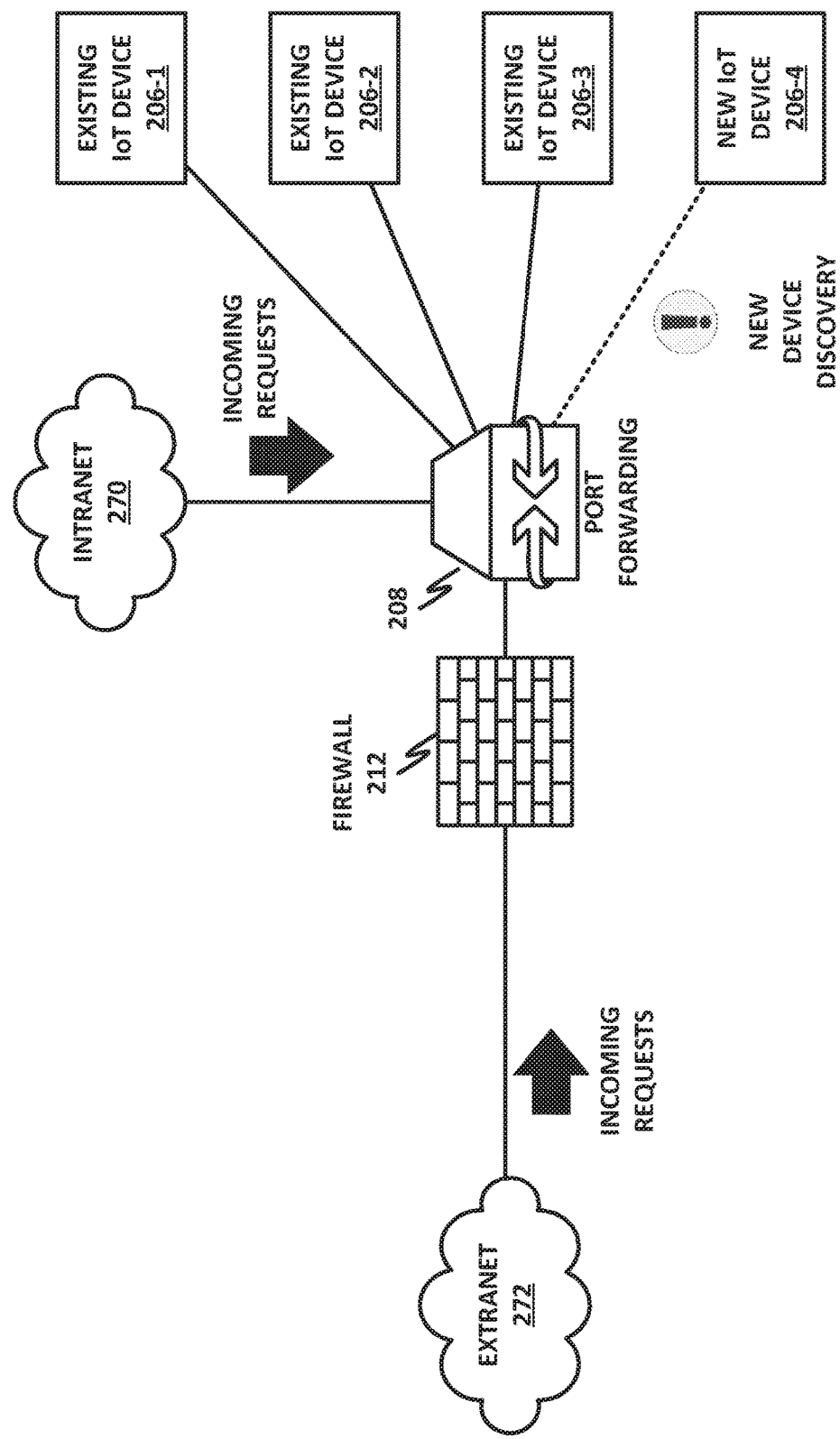
FIG. 2 is a block diagram illustrating additional features of a home network, such as a smart home, according to one or more examples of the present specification.

FIG. 2 is a block diagram illustrating additional features of a home network, such as a smart home, according to one or more examples of the present specification. In the example of FIG. 2, a plurality of IoT devices 206 are communicatively coupled to a home gateway 208. Home gateway 208 services an intranet 270, and may also communicatively couple intranet 270 to an extranet 272. Intranet 270 may be separated from extranet 272 by a firewall 212, which may be a separate appliance, or which may be a built-in function of home gateway 208.

In this example, existing IoT devices 206-1, 206-2, and 206-3 already exist and are configured on the network. Home gateway 208 may have an APRT as illustrated herein, which may include rules for providing authentication when a user attempts to access a login interface of an IoT device 206. Home gateway 208 may also provide, for example, port forwarding, whereby certain access interfaces of IoT devices 206 are accessible via extranet 272. Thus, for example, by forwarding certain ports to IoT devices 206-2, home gateway 208 enables a user who is not connected to home gateway 208 to control functions of those IoT devices. This could be used so that a user, for example, could set the thermostat or change lighting while at work, so that the home is in a comfortable condition when she arrives home. Thus, home gateway 208 can service incoming requests both from intranet 270 and extranet 272.

Note that in some examples, home gateway 208 may be configured to discriminate between incoming requests on intranet 270 and extranet 272. This can be useful in crafting policies for certain login interfaces. For example, some interfaces may only be accessible via intranet 270, others may be accessible only via extranet 272, and others may be accessible via either one. Furthermore, additional limits could be placed, such as context-sensitive limits, so that incoming requests from extranet 272 may be permissible only during certain times, and only under certain conditions. Many other configurations are possible.

Also illustrated in this FIGURE is new IoT device 206-4. Home gateway 208 may be configured to periodically scan intranet 270 for newly added devices so that it can automatically configure those devices when they are discovered. However, in some cases, home gateway 208 provides other features such as a router which may have a DHCP server. Thus, when a new device requests an address via DHCP, home gateway 208 may take that opportunity instead to configure the device. As discussed above, configuring the new device may take the form, for example, of using a dictionary of common access interfaces, default passwords, and default usernames to populate the APRT.

Figure 3:
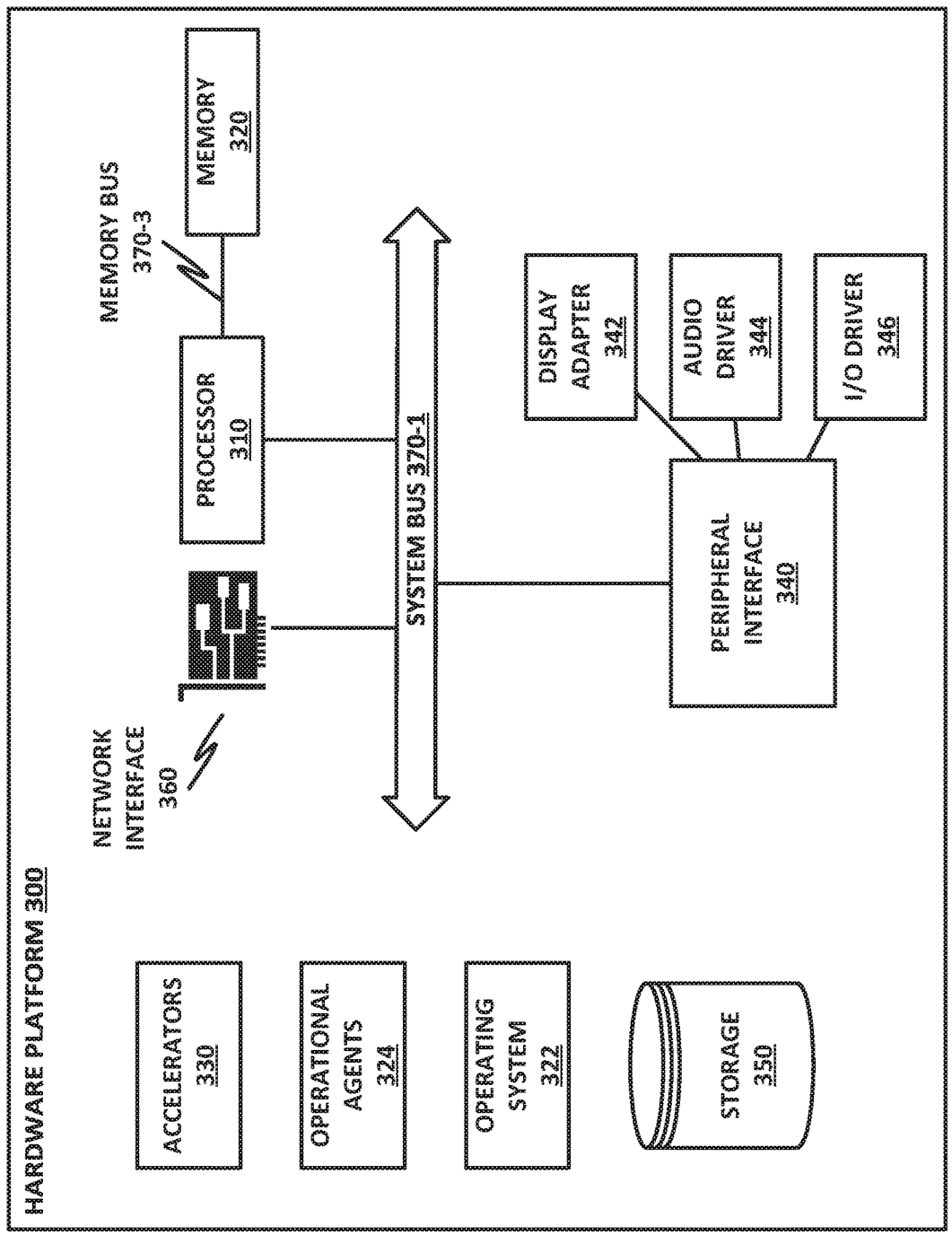
FIG. 3 is a block diagram illustrating a hardware platform, according to one or more examples of the present specification.

FIG. 3 is a block diagram illustrating a hardware platform 300, according to one or more examples of the present specification. Hardware platform 300 may represent any suitable computing device. In various embodiments, a "computing device" may be or comprise, by way of nonlimiting example, a computer, workstation, server, mainframe, virtual machine (whether emulated or on a "bare-metal" hypervisor), network appliance, container, IoT device, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110, home gateway 108, and the IoT devices illustrated in FIG. 1 may all be examples of devices that run on a hardware platform such as hardware platform 300. FIG. 3 presents a view of many possible elements that may be included in a hardware platform, but it should be understood that not all of these are necessary in every platform, and platforms may also include other elements. For example, peripheral interface 340 may be an essential component in a user-class device to provide input and output, while it may be completely unnecessary in a virtualized server or hardware appliance that communicates strictly via networking protocols.

By way of illustrative example, hardware platform 300 provides a processor 310 connected to a memory 320 and other system resources via one or more buses, such a system bus 370-1 and a memory bus 370-3.

Other components of hardware platform 300 include a storage 350, network interface 360, and peripheral interface 340. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 320 and storage 350, for example, in a single physical memory device, and in other cases, memory 320 and/or storage 350 are functionally distributed across many physical devices. In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 360 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In various examples, a "processor" may include any combination of logic elements operable to execute instructions, whether loaded from memory, or implemented directly in hardware, including, by way of nonlimiting example, a microprocessor, digital signal processor, field-programmable gate array, graphics processing unit, programmable logic array, application-specific integrated circuit, or virtual machine processor. In certain architectures, a multi-core processor may be provided, in which case processor 310 may be treated as only one core of a multi-core processor, or may be treated as the entire multi-core processor, as appropriate. In some embodiments, one or more co-processors may also be provided for specialized or support functions.

Processor 310 may be communicatively coupled to devices via a system bus 370-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 370-1 is not so limited, and may include any other type of bus. Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 310 is communicatively coupled to memory 320 via memory bus 370-3, which may be, for example, a direct memory access (DMA) bus, though other memory architectures are possible, including ones in which memory 320 communicates with processor 310 via system bus 370-1 or some other bus. In the same or an alternate embodiment, memory bus 370-3 may include remote direct memory access (RDMA), wherein processor 310 accesses disaggregated memory resources via DMA or DMA-like interfaces.

To simplify this disclosure, memory 320 is disclosed as a single logical block, but in a physical embodiment may include one or more blocks of any suitable volatile or nonvolatile memory technology or technologies, including, for example, double data rate random-access memory (DDR RAM), static random-access memory (SRAM), dynamic random-access memory (DRAM), persistent random-access memory (PRAM), or other similar persistent fast memory, cache, Layer 1 (L1) or Layer 2 (L2) memory, on-chip memory, registers, flash, read-only memory (ROM), optical media, virtual memory regions, magnetic or tape memory, or similar. In certain embodiments, memory 320 may comprise a relatively low-latency volatile main memory, while storage 350 may comprise a relatively higher-latency nonvolatile memory. However, memory 320 and storage 350 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 350 may be any species of memory 320, or may be a separate device. Storage 350 may include one or more nontransitory computer-readable mediums, including, by way of nonlimiting example, a hard drive, solid-state drive, external storage, microcode, hardware instructions, redundant array of independent disks (RAID), network attached storage (NAS), optical storage, tape drive, backup system, cloud storage, or any combination of the foregoing. Storage 350 may be, or may include therein, a database or databases or data stored in other configurations, and may include a stored copy of operational software such as operating system 322 and software portions, if any, of operational agents 324, accelerators 330, or other engines. Many other configurations are also possible, and are intended to be encompassed within the broad scope of this specification.

As necessary, hardware platform 300 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 300 may be configured for virtualization or containerization, in which case it may also provide a hypervisor, virtualization platform, virtual machine manager (VMM), orchestrator, containerization platform, or other infrastructure to provide flexibility in allocating resources.

Network interface 360 may be provided to communicatively couple hardware platform 300 to a wired or wireless network or fabric. A "network," as used throughout this specification, may include any communicative platform operable to exchange data or information within or between computing devices, including, by way of nonlimiting example, a local network, a switching fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Operational agents 324 are one or more computing engines that may include one or more nontransitory computer-readable mediums having stored thereon executable instructions operable to instruct a processor to provide operational functions. At an appropriate time, such as upon booting hardware platform 300 or upon a command from operating system 322 or a user or security administrator, processor 310 may retrieve a copy of operational agents 324 (or software portions thereof) from storage 350 and load it into memory 320. Processor 310 may then iteratively execute the instructions of operational agents 324 to provide the desired methods or functions.

As used throughout this specification, an "engine" includes any combination of one or more logic elements, of similar or dissimilar species, operable for and configured to perform one or more methods provided by the engine. In some cases, the engine may include a special integrated circuit designed to carry out a method or a part thereof, a field-programmable gate array (FPGA) programmed to provide a function, other programmable logic, and/or software instructions operable to instruct a processor to perform the method. In some cases, the engine may run as a "daemon" process, background process, terminate-and-stay-resident program, a service, system extension, control panel, bootup procedure, basic input/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware and software, including configuration files, registry entries, application programming interfaces (APIs), and interactive or user-mode software by way of nonlimiting example.

Peripheral interface 340 may be configured to interface with any auxiliary device that connects to hardware platform 300 but that is not necessarily a part of the core architecture of hardware platform 300. A peripheral may be operable to provide extended functionality to hardware platform 300, and may or may not be wholly dependent on hardware platform 300. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 342, audio driver 344, and input/output (I/O) driver 346. Display adapter 342 may be configured to provide a human-readable visual output, such as a command-line interface (CLI) or graphical desktop such as Microsoft Windows, Apple OSX desktop, or a Unix/Linux X Window System-based desktop. Display adapter 342 may provide output in any suitable format, such as a coaxial output, composite video, component video, video graphic array (VGA), or digital outputs such as digital visual interface (DVI) or high definition multimedia interface (HDMI), by way of nonlimiting example. In some examples, display adapter 342 may include a hardware graphics card, which may have its own memory and its own graphics processing unit (GPU). Audio driver 344 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

Figure 4:
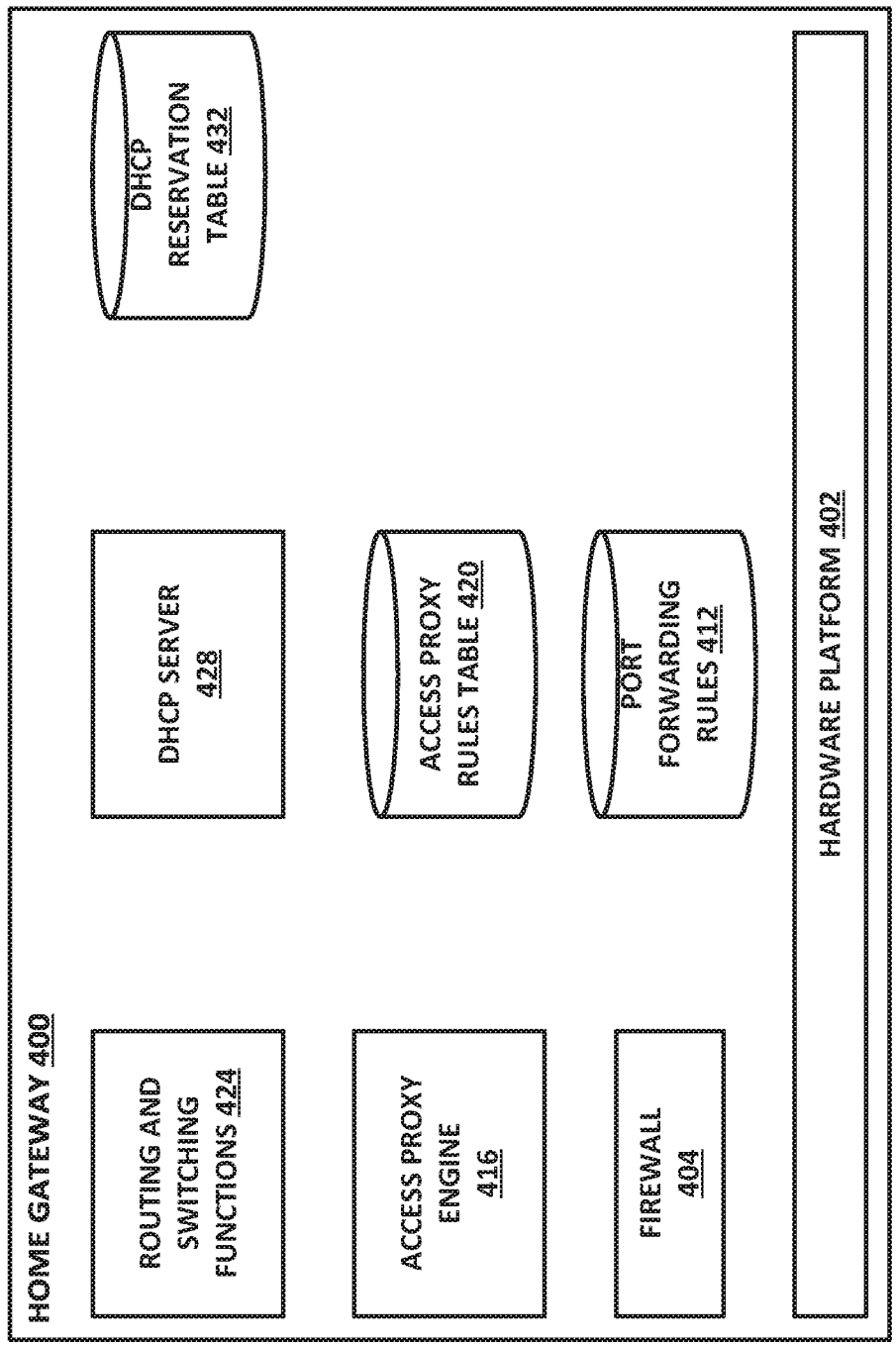
FIG. 4 is a block diagram of a home gateway, according to one or more examples of the present specification.

FIG. 4 is a block diagram of a home gateway 400, according to one or more examples of the present specification. Home gateway 400 operates on a hardware platform 402, which may include, for example, some or all of the elements illustrated in hardware platform 300 of FIG. 3.

Operating on hardware platform 402 are various home gateway functions, including, for example, a firewall 404, routing and switching functions 424, and a DHCP server 428. Note that these are illustrated here as part of a home gateway, and are commonly included with such home gateways. But these should be understood to be nonlimiting examples. In other embodiments, particularly in an enterprise context, it is common for some or all of these functions to be provided by dedicated hardware or virtual appliances that perform a single function.

DHCP server 428 may include a DHCP reservation table 432, and may dynamically assign IP addresses to various hosts that connect on an internal network. Note that DHCP server 428 is provided as a nonlimiting example only, and other configurations are possible, including self-assigned IP addresses and static IP address assignments. One benefit of using a DHCP reservation table 432 is that a host can consistently be assigned the same IP address based on its unchanging media access control (MAC) address. This can be useful if the APRT relies on IP addresses for its rules. Note, however, that this is a nonlimiting example. In other examples, the APRT could be based on a MAC address, or could correspond a MAC address to an IP address, and thus may be able to dynamically self-update as IP address assignments change.

Routing and switching functions 424 are common functions of a home gateway, and are provided to direct traffic from an ingress interface to an egress interface, based on certain port forwarding or port assignment rules. Such routing and switching functions are well understood in the art.

Firewall 404 is a similarly well-known function that isolates intranet traffic from extranet traffic. Firewall 404 may employ port forwarding rules 412, which in some embodiments may be used to forward certain ports to destination devices so that they can handle incoming traffic. This can be useful, for example, in cases where it is desirable for a login interface of a particular device to be accessible via an extranet, such as the Internet.

Access proxy engine 416 is an engine as described in connection with FIG. 3. Access proxy engine 416 employs an access proxy rules table 420, and provides the logic for intercepting incoming traffic requests and identifying them as access requests, directed to IoT devices in the network. For example, access proxy engine 416 may identify incoming requests as device access requests based on HTML tags, HTTP or HTTPS ports, URLs, or other data that identify a request as a device access request.

Figure 5:
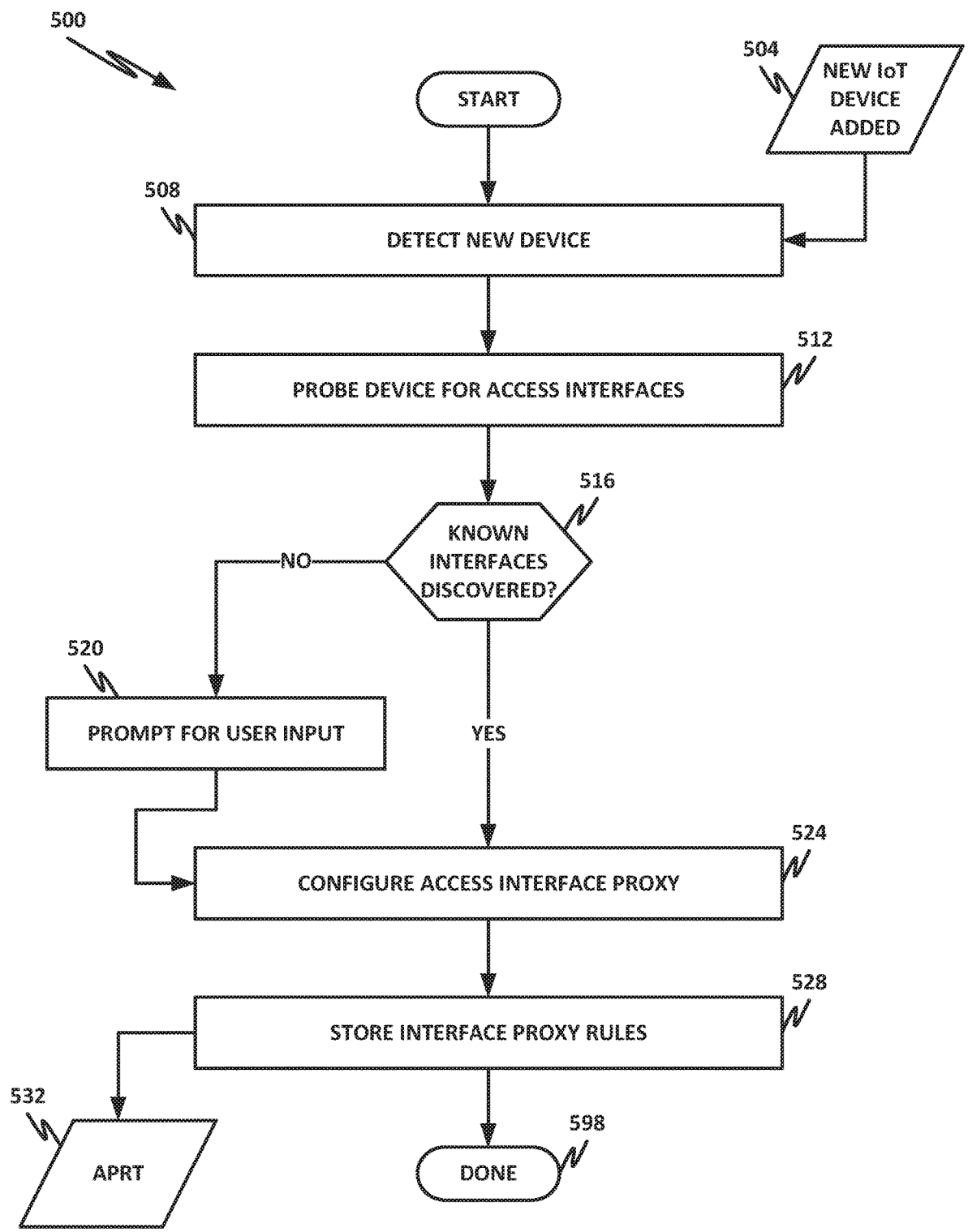
FIG. 5 is a flowchart of a method of scanning, identifying, and configuring a new IoT device that is discovered on a network, according to one or more examples of the present specification.
Figure 6:
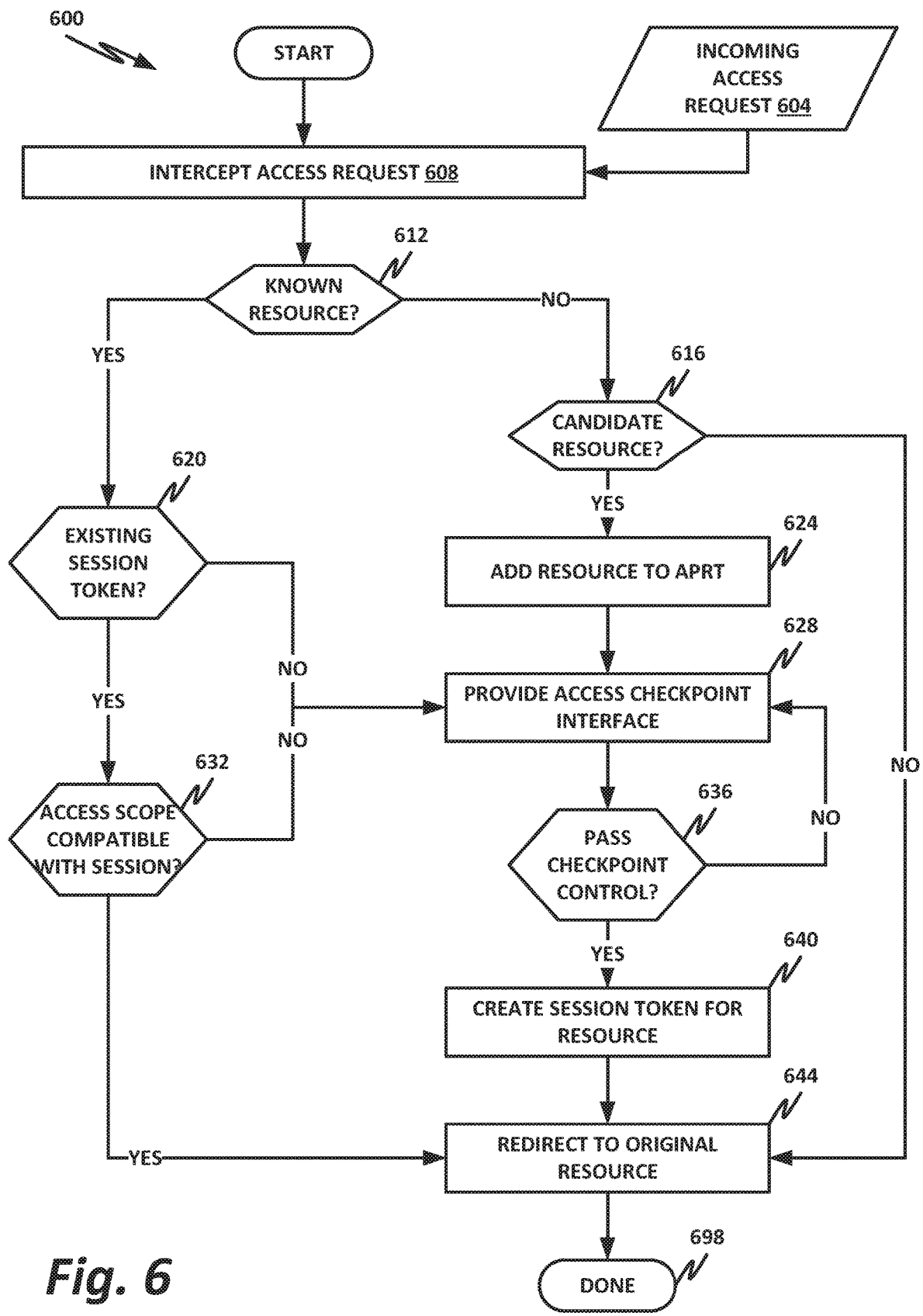
FIG. 6 is a flowchart illustrating a method which may be performed, for example, by an access proxy engine or other suitable hardware or software, according to one or more examples of the present specification.

Access proxy engine 416 may be configured to perform functions or methods, such as methods 500 of FIGS. 5 and 600 of FIG. 6, in addition to other methods consistent with the present specification.

In some embodiments, access proxy engine 416 may be provided as a software or firmware program provided on one or more tangible, non-transitory computer readable storage mediums having stored thereon instructions, microcode, or other data for programming a processor or other programmable device to carry out the functions. Also note that access proxy engine 416 could be provided by separate hardware, a processor, a coprocessor, an ASIC, an FPGA, or any other suitable hardware and/or software device.

FIG. 5 is a flowchart of a method 500, according to one or more examples of the present specification. Method 500 may be performed by any suitable device or logic function, including, for example, by an access proxy engine 416 as illustrated in FIG. 4.

FIG. 5 illustrates a method of scanning, identifying, and configuring a new IoT device that is discovered on the network. This could be the result of a periodic scan, or the result of identifying a new device as it requests an IP address via DHCP, or via other means.

In block 508, the system detects that a new IoT device has been added, as shown in block 504.

In block 512, the system may probe the new device for access interfaces. As discussed above, this could be via a dictionary of common access interfaces, including common usernames and password combinations that may be provided for those interfaces. This could include probing for HTML, extensible markup language (XML), PHP, ASP, or other similar data structures with names like "index," "default," "main," or similar that are commonly used. Common username and password combinations could also be tried. In some cases, the system may have access to a database that includes known default username and password combinations. For example, a security services provider, such as security services provider 190 of FIG. 1, could maintain such a database, in which case the system could query the security services provider for a known username and password combination, or possible username and password combinations for a particular device and model.

In decision block 516, the system determines whether a known interface was discovered. If no known interfaces were discovered, then in block 520, the system may prompt the user for input. This may allow the user, for example, to consult product literature or other resources to identify the default username and password. Also note that in some cases, the default username and password may not be necessary, for example, if a tiered access structure is desired, wherein the user authenticates to the home gateway, and then separately authenticates to the device.

Once the system has the required information, either through automated probing, or via user input, then in block 524, the system configures an access interface proxy for that particular access interface.

In block 528, the system stores the interface proxy rules, for example, in APRT 532.

In block 598, the method is done.

FIG. 6 is a flowchart illustrating a method 600 which may be performed, for example, by an access proxy engine 416 or other suitable hardware or software, according to one or more examples of the present specification.

Starting in block 608, the system intercepts an incoming access request 604. This may occur, for example, when the user attempts to access a resource on a particular device.

In decision block 612, the system determines whether the resource being accessed is a known resource, for example, a resource that already has an existing entry in an APRT.

If this is a known resource, then in block 620, the system determines whether there is an existing session token for this resource. For example, if the user has recently accessed the resource, there may be an existing session, which may mean that there is not a need to authenticate to the home gateway at this time. If there is an existing session token, then in decision block 632, the system determines whether the current access scope is compatible with the existing session. For example, if the session was established within the intranet, and the current access is from the extranet, the access may be incompatible.

If the access scope is compatible with the session, then in block 644, the system redirects to the original resource, and in block 698, the method is done.

Returning to decision blocks 620 and 632, if there is either not an existing session token or the access scope is incompatible with the session, then in block 628, the system provides the access checkpoint interface, for example, requiring the user to authenticate to the home gateway as described herein.

Returning to decision block 612, if the current resource is not a known resource, then in decision block 616, the system determines whether this is a candidate resource for interception. If this is not a candidate resource, then in block 644, the user is redirected to the original resource, and in block 698, the method is done.

If, however, this is a candidate resource, then in block 624, an entry for this resource may be added to the APRT.

In block 628, which may be encountered either after the resource has been added to the APRT, or after it is determined that there is no existing session token, or that the current access is incompatible with the existing session, the system provides the access checkpoint interface to the user. This may require the user to enter credentials, such as those used to log into the home gateway itself. Depending on the context, severity, and other factors, the strength of authentication or the method of authentication may be varied. For example, for more sensitive resources, two-factor authentication, biometric authentication, token authentication, or other stronger authentication than a simple username and password may be required. Furthermore, in some cases of less severity, the username and password for the router may be used, while for more serious or severe resources, a separate username and password, which may have stronger security requirements, may be required.

In block 636, it is determined whether the user has successfully passed the checkpoint control, whatever that entails in this context. If not, then control may return to block 628. Note, however, that in some embodiments, too many unsuccessful access requests may result in a lockout, which may timeout after a certain amount of time, such as one minute, ten minutes, one hour, 24 hours, or some other time.

Returning to block 636, if the user successfully passes the checkpoint control, then in block 640, the system creates a session token for this resource. This may ease access to the resource later if the user continues to access the resource over time.

In block 644, the user is redirected to the original resource, and in block 698, the method is done.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a gateway apparatus to operate on an intranet, comprising: a hardware platform; and an access proxy engine to operate on the hardware platform and configured to: intercept an incoming packet; determine that the incoming packet is an access request directed to an access interface of a resource of the intranet; present an access checkpoint interface; receive an authentication input response; validate the authentication input response; and provide a redirection to the access interface of the device.

There is further disclosed the gateway apparatus of example 1, further comprising an access proxy rules table (APRT) comprising data to correlate the resource with a host device and a security policy for the resource.

There is further disclosed the gateway apparatus of example 2, wherein the APRT further comprises stored login credentials for the resource, wherein the access proxy engine is configured to perform a login action before providing the redirection.

There is further disclosed the gateway apparatus of example 2, wherein the access proxy engine is further configured to identify the resource as a known resource having an existing entry in the APRT.

There is further disclosed the gateway apparatus of example 2, wherein the access proxy engine is further configured to determine that the resource does not have an existing entry in the APRT, and to create an entry for the resource in the APRT.

There is further disclosed the gateway apparatus of example 2, wherein the APRT further comprises a severity field, wherein the severity field corresponds to a strictness of the security policy for a resource.

There is further disclosed the gateway apparatus of example 1, wherein the access proxy engine is further configured to establish a session for accessing the resource.

There is further disclosed the gateway apparatus of example 7, wherein the access proxy engine is further configured to receive a second access request for the resource, and determine that there is an existing session for the resource.

There is further disclosed the gateway apparatus of example 8, wherein the access proxy engine is configured to provide redirection without presenting the access checkpoint interface after determining that the request is within scope of an existing session.

There is further disclosed the gateway apparatus of example 8, wherein the access proxy engine is further configured to determine that a current request is out of scope of the existing session, and present the access checkpoint interface.

There is further disclosed the gateway apparatus of any of examples 1-10, wherein the access proxy engine is further configured to periodically scan the intranet for new devices, and to add access proxy rules table (APRT) entries for any new devices found.

There is further disclosed the gateway apparatus of any of examples 1-10, wherein the access proxy engine is further configured to determine that a new device has been added to the intranet, and to add an access proxy rules table (APRT) entry for the new device.

There is further disclosed the gateway apparatus of any of examples 1-12, wherein the access proxy engine is further configured to attempt to identify authentication credentials for a new device by testing a dictionary of common credentials.

There is further disclosed the gateway apparatus of any of examples 1-12, wherein the access proxy engine is further configured to attempt to identify authentication credentials for a new device by querying a credentials service for possible credentials.

There is further disclosed the gateway apparatus of any of examples 1-14, wherein the resource is an Internet of things (IoT) device.

There are also disclosed one or more tangible, non-transitory computer-readable storage mediums having stored thereon instructions to instruct a device to provide an access proxy engine configured to: intercept an incoming packet; determine that the incoming packet is an access request directed to an access interface of a resource of the intranet; present an access checkpoint interface; receive an authentication input response; validate the authentication input response; and provide a redirection to the access interface of the device.

There are further disclosed the one or more tangible, non-transitory computer-readable storage mediums of example 16, wherein the instructions are further to provide an access proxy rules table (APRT) comprising data to correlate the resource with a host device and a security policy for the resource.

There are further disclosed the one or more tangible, non-transitory computer-readable storage mediums of example 17, wherein the APRT further comprises stored login credentials for the resource, wherein the access proxy engine is configured to perform a login action before providing the redirection.

There are further disclosed the one or more tangible, non-transitory computer-readable storage mediums of example 17, wherein the access proxy engine is further configured to identify the resource as a known resource having an existing entry in the APRT.

There are further disclosed the one or more tangible, non-transitory computer-readable storage mediums of example 17, wherein the access proxy engine is further configured to determine that the resource does not have an existing entry in the APRT, and to create an entry for the resource in the APRT.

There are further disclosed the one or more tangible, non-transitory computer-readable storage mediums of example 17, wherein the APRT further comprises a severity field, wherein the severity field corresponds to a strictness of the security policy for a resource.

There are further disclosed the one or more tangible, non-transitory computer-readable storage mediums of example 16, wherein the access proxy engine is further configured to establish a session for accessing the resource.

There are further disclosed the one or more tangible, non-transitory computer-readable storage mediums of example 22, wherein the access proxy engine is further configured to receive a second access request for the resource, and determine that there is an existing session for the resource.

There are further disclosed the one or more tangible, non-transitory computer-readable storage mediums of example 23, wherein the access proxy engine is configured to provide redirection without presenting the access checkpoint interface after determining that the request is within scope of an existing session.

There are further disclosed the one or more tangible, non-transitory computer-readable storage mediums of example 23, wherein the access proxy engine is further configured to determine that a current request is out of scope of the existing session, and present the access checkpoint interface.

There are further disclosed the one or more tangible, non-transitory computer-readable storage mediums of any of examples 16-25, wherein the access proxy engine is further configured to periodically scan the intranet for new devices, and to add access proxy rules table (APRT) entries for any new devices found.

There are further disclosed the one or more tangible, non-transitory computer-readable storage mediums of any of examples 16-25, wherein the access proxy engine is further configured to determine that a new device has been added to the intranet, and to add an access proxy rules table (APRT) entry for the new device.

There are further disclosed the one or more tangible, non-transitory computer-readable storage mediums of any of examples 16-27, wherein the access proxy engine is further configured to attempt to identify authentication credentials for a new device by testing a dictionary of common credentials.

There are further disclosed the one or more tangible, non-transitory computer-readable storage mediums of any of examples 16-27, wherein the access proxy engine is further configured to attempt to identify authentication credentials for a new device by querying a credentials service for possible credentials.

There are further disclosed the one or more tangible, non-transitory computer-readable storage mediums of any of examples 16-29, wherein the resource is an Internet of things (IoT) device.

There is also disclosed a computer-implemented method of providing a gateway device, comprising: intercepting an incoming packet; determining that the incoming packet is an access request directed to an access interface of a resource of the intranet; presenting an access checkpoint interface; receiving an authentication input response; validating the authentication input response; and providing a redirection to the access interface of the device.

There is further disclosed the method of example 31, further comprising providing an access proxy rules table (APRT) comprising data to correlate the resource with a host device and a security policy for the resource.

There is further disclosed the method of example 32, further comprising storing login credentials for the resource, and performing a login action before providing the redirection.

There is further disclosed the method of example 32, further comprising identifying the resource as a known resource having an existing entry in the APRT.

There is further disclosed the method of example 32, further comprising determining that the resource does not have an existing entry in the APRT, and to create an entry for the resource in the APRT.

There is further disclosed the method of example 32, wherein the APRT further comprises a severity field, wherein the severity field corresponds to a strictness of the security policy for a resource.

There is further disclosed the method of example 31, further comprising establishing a session for accessing the resource.

There is further disclosed the method of example 37, further comprising receiving a second access request for the resource, and determining that there is an existing session for the resource.

There is further disclosed the method of example 38, further comprising providing redirection without presenting the access checkpoint interface after determining that the request is within scope of an existing session.

There is further disclosed the method of example 38, further comprising determining that a current request is out of scope of the existing session, and present the access checkpoint interface.

There is further disclosed the method of any of examples 31-40, further comprising periodically scanning the intranet for new devices, and to add access proxy rules table (APRT) entries for any new devices found.

There is further disclosed the method of any of examples 31-40, further comprising determining that a new device has been added to the intranet, and to add an access proxy rules table (APRT) entry for the new device.

There is further disclosed the method of any of examples 31-42, further comprising attempting to identify authentication credentials for a new device by testing a dictionary of common credentials.

There is further disclosed the method of any of examples 31-42, further comprising identifying authentication credentials for a new device by querying a credentials service for possible credentials.

There is further disclosed the method of any of examples 31-44, wherein the resource is an Internet of things (IoT) device.

There is further disclosed an apparatus comprising means for performing the method of any of examples 31-45.

There is further disclosed the apparatus of example 46, wherein the means for performing the method comprise a processor and a memory.

There is further disclosed the apparatus of example 47, wherein the memory comprises machine-readable instructions, that when executed cause the apparatus to perform the method of any of examples 31-45.

There is further disclosed the apparatus of any of examples 47-48, wherein the apparatus is a computing system.

There is further disclosed at least one computer readable medium comprising instructions that, when executed, implement a method or realize an apparatus as illustrated in any of examples 31-49.

What is claimed is:

1. A gateway apparatus to operate on an intranet, comprising:
   a hardware platform; and
   an access proxy engine to operate on the hardware platform and configured to:
      intercept an access request directed to an access interface of a resource of the intranet;
      present an access checkpoint interface that requests an authentication input to the gateway apparatus;
      receive the authentication input;
      perform an authentication to the resource, based on a validation of the authentication input; and
      provide a redirection to the access interface of the resource.

2. The gateway apparatus of claim 1, further comprising an access proxy rules table (APRT) comprising data to correlate the resource with a host device and a security policy for the resource.

3. The gateway apparatus of claim 2, wherein the APRT further comprises stored login credentials for the resource, wherein the access proxy engine is configured to perform the authentication before providing the redirection.

4. The gateway apparatus of claim 2, wherein the access proxy engine is further configured to determine whether a session exists, based on identifying the resource has an existing entry in the APRT.

5. The gateway apparatus of claim 2, wherein the access proxy engine is further configured to determine that the resource does not have an existing entry in the APRT, and to create an entry for the resource in the APRT.

6. The gateway apparatus of claim 2, wherein the APRT further comprises a severity field indicating a potential harm or severity of an unauthorized access to the resource, and the access proxy engine is further configured to craft the security policy based on the severity field.

7. The gateway apparatus of claim 1, wherein the access proxy engine is further configured to establish a session for accessing the resource.

8. The gateway apparatus of claim 7, wherein the access proxy engine is further configured to receive a second access request for the resource, and determine that there is an existing session for the resource.

9. The gateway apparatus of claim 8, wherein the access proxy engine is configured to provide a redirection without presenting the access checkpoint interface after determining that the second access request is within scope of the existing session.

10. The gateway apparatus of claim 8, wherein the access proxy engine is further configured to present the access checkpoint interface based on a determination that a current request is out of scope of the existing session.

11. The gateway apparatus of claim 1, wherein the access proxy engine is further configured to periodically scan the intranet for devices, and to add APRT entries for the devices.

12. The gateway apparatus of claim 1, wherein the access proxy engine is further configured to determine that a new device has been added to the intranet, and to add APRT entry for the new device.

13. The gateway apparatus of claim 1, wherein the access proxy engine is further configured to attempt to identify authentication credentials for a device by testing a dictionary of common credentials.

14. The gateway apparatus of claim 1, wherein the access proxy engine is further configured to attempt to identify authentication credentials for a device by querying a credentials service for possible credentials.

15. A gateway apparatus to operate on an intranet, comprising:
   a hardware platform; and
   an access proxy engine to operate on the hardware platform and configured to:
      intercept an incoming packet;
      determine that the incoming packet is an access request directed to an access interface of a resource of the intranet;
      present an access checkpoint interface;
      receive an authentication input response;
      validate the authentication input response; and
      provide a redirection to the access interface of the resource, wherein the resource is an internet of things (IoT) device.

16. One or more tangible, non-transitory computer-readable storage mediums having stored thereon instructions to instruct a device to provide an access proxy engine configured to:

intercept an access request directed to an access interface of a resource of an intranet;

present an access checkpoint interface that requests an authentication input to the device;

receive the authentication input;

perform an authentication to the resource, based on a validation of the authentication input; and provide a redirection to the access interface of the resource.

17. The one or more tangible, non-transitory computer-readable storage mediums of claim 16, wherein the instructions are further to provide an access proxy rules table (APRT) comprising data to correlate the resource with a host device and a security policy for the resource.

18. The one or more tangible, non-transitory computer-readable storage mediums of claim 17, wherein the APRT further comprises stored login credentials for the resource, and the access proxy engine is configured to perform the authentication before providing the redirection.

19. The one or more tangible, non-transitory computer-readable storage mediums of claim 17, wherein the access proxy engine is further configured to determine whether a session exists, based on identifying the resource has an existing entry in the APRT.

20. The one or more tangible, non-transitory computer-readable storage mediums of claim 17, wherein the access proxy engine is further configured to determine that the resource does not have an existing entry in the APRT, and to create an entry for the resource in the APRT.

21. The one or more tangible, non-transitory, computer-readable storage mediums of claim 17, wherein the APRT further comprises a severity field indicating a potential harm or severity of an unauthorized access to the resource, and the access proxy engine is further configured to craft the security policy based on the severity field.

22. The one or more tangible, non-transitory, computer-readable storage mediums of claim 16, wherein the access proxy engine is further configured to establish a session for accessing the resource.

23. A computer-implemented method of a gateway device, comprising:

intercepting an access request directed to an access interface of a resource of an intranet;

presenting an access checkpoint interface that requests an authentication input to the gateway device;

receiving the authentication input;

performing an authentication to the resource, based on a validation of the authentication input; and providing a redirection to the access interface of the resource.

24. The method of claim 23, further comprising providing an access proxy rules table (APRT) comprising data to correlate the resource with a host device and a security policy for the resource.

25. The method of claim 24, further comprising storing login credentials for the resource, and performing the authentication before providing the redirection.

* * * * *

UNITED STATES PATENT AND TRADEMARK OFFICE
CERTIFICATE OF CORRECTION

PATENT NO. : 10,728,218 B2
APPLICATION NO. : 15/905606
DATED : July 28, 2020
INVENTOR(S) : German Lancioni et al.

Page 1 of 1

It is certified that error appears in the above-identified patent and that said Letters Patent is hereby corrected as shown below:

In the Claims

In Column 24, Line 62, in Claim 15, delete "internet;" and insert -- Internet -- therefor.

In Column 25, Line 10, in Claim 17, after "non-transitory" insert -- , -- therefor.

In Column 25, Line 15, in Claim 18, after "non-transitory" insert -- , -- therefor.

In Column 25, Line 20, in Claim 19, after "non-transitory" insert -- , -- therefor.

In Column 25, Line 25, in Claim 20, after "non-transitory" insert -- , -- therefor.

Signed and Sealed this
Eighth Day of September, 2020

Andrei Iancu
*Director of the United States Patent and Trademark Office*